(12) United States Patent
Lu et al.

(10) Patent No.: US 11,218,628 B2
(45) Date of Patent: Jan. 4, 2022

(54) METHOD AND SYSTEM FOR IDENTIFYING LIGHT SOURCE AND APPLICATION THEREOF

(71) Applicant: ZHEJIANG DAHUA TECHNOLOGY CO., LTD., Zhejiang (CN)

(72) Inventors: Wuping Lu, Hangzhou (CN); Zhiqiang Yang, Hangzhou (CN); Zhigang Yuan, Hangzhou (CN); Lanye Xu, Hangzhou (CN); Mingyan Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/931,522

(22) Filed: Jul. 17, 2020

(65) Prior Publication Data

US 2020/0351433 A1 Nov. 5, 2020

Related U.S. Application Data

(63) Continuation of application No. PCT/CN2018/125288, filed on Dec. 29, 2018.

(30) Foreign Application Priority Data

Jan. 17, 2018 (CN) .......................... 201810044925.4

(51) Int. Cl.
*H04N 5/232* (2006.01)
*G06K 9/03* (2006.01)
(Continued)

(52) U.S. Cl.
CPC ........... *H04N 5/23218* (2018.08); *G06K 9/03* (2013.01); *G06K 9/4661* (2013.01); *H04N 5/23299* (2018.08); *H04N 5/247* (2013.01)

(58) Field of Classification Search
CPC ........... H04N 5/23218; H04N 5/23299; H04N 5/247; H04N 5/23206; H04N 5/33;
(Continued)

(56) References Cited

U.S. PATENT DOCUMENTS

2606/0002124    1/2006  Nguyen
2009/0114821 A1    5/2009  Gamroth et al.
(Continued)

FOREIGN PATENT DOCUMENTS

CN    101428590 A    5/2009
CN    201414181 Y    2/2010
(Continued)

OTHER PUBLICATIONS

International Search Report in PCT/CN2018/125288 dated Mar. 13, 2019, 4 pages.
(Continued)

*Primary Examiner* — James M Pontius
(74) *Attorney, Agent, or Firm* — Metis IP LLC

(57) ABSTRACT

The present disclosure relates to an apparatus and method for identifying light source. The method includes receiving an infrared image of an environment captured by an imaging apparatus in a first configuration. The method also includes identifying, based on the infrared image, that a light source exists in the environment captured in the infrared image. The method further includes generating an order for changing the imaging apparatus from the first configuration to a second configuration.

20 Claims, 9 Drawing Sheets

(51) Int. Cl.
*G06K 9/46* (2006.01)
*H04N 5/247* (2006.01)

(58) Field of Classification Search
CPC ........ H04N 5/232; G06K 9/03; G06K 9/4661; G06T 7/0002; G06T 2207/10048
See application file for complete search history.

(56) References Cited

U.S. PATENT DOCUMENTS

2015/0264267 A1  9/2015  Park et al.
2019/0364218 A1* 11/2019  Yang ..................... H04N 5/238

FOREIGN PATENT DOCUMENTS

| CN | 102331795 A | 1/2012 |
|---|---|---|
| CN | 102842025 A | 12/2012 |
| CN | 203148422 U | 8/2013 |
| CN | 102889932 B | 6/2014 |
| CN | 105403890 A | 3/2016 |
| CN | 105512667 A | 4/2016 |
| CN | 105991936 A | 10/2016 |
| CN | 106157518 A | 11/2016 |
| CN | 106874869 A | 6/2017 |
| CN | 206331217 U | 7/2017 |
| EP | 2764686 B1 | 10/2019 |
| EP | 3573328 A1 | 11/2019 |

OTHER PUBLICATIONS

Written Opinion in PCT/CN2018/125288 dated Mar. 13, 2019, 3 pages.
First Office Action in Chinese Application No. 201810044925.4 dated Jun. 18, 2019, 15 pages.
The European Extended Search Report in European Application No. 18900736.2 dated Nov. 26, 2020, 12 Pages.

* cited by examiner

METHOD AND SYSTEM FOR IDENTIFYING LIGHT SOURCE AND APPLICATION THEREOF

CROSS-REFERENCE TO RELATED APPLICATIONS

This application is a Continuation Application of International Application No. PCT/CN2018/125288 filed on Dec. 29, 2018, which claims priority to Chinese Patent Application No. 201810044925.4 filed on Jan. 17, 2018, the entire contents of which are hereby incorporated by reference.

TECHNICAL FIELD

The present disclosure generally relates to image processing, and in particular, to a method and apparatus for identifying a light source in an environment by way of image processing and application thereof.

BACKGROUND

With its rapid development, thermal imaging or infrared imaging is widely used in various fields. An infrared imaging device may be used in an environment with poor lighting conditions due to its ability to detect infrared radiations emitted by an object in an environment and generate an infrared image accordingly. The infrared radiations are generally related to the thermal energy or temperature of the object. Thus, thermal imaging technology may be employed to detect objects in an environment or distinguish objects with different temperatures from each other.

Although an infrared imaging device may be sensitive to infrared radiation and generally has a wide detection range in terms of energy levels of radiation sources, the infrared imaging device may be damaged by a light source with extremely high energy or temperature, such as the sun. The accuracy and detection range of the infrared imaging device may be seriously reduced when the infrared imaging device is damaged. In addition, many infrared imaging devices are equipped with fire detection components and/or programs that may enable these infrared imaging devices to identify fire spots and continuously monitor the identified fire spots. However, these infrared imaging devices may sometimes identify a light source with extremely high energy or temperature (e.g., the sun) as a fire spot, continuously monitor the light source, and hence be damaged.

Therefore, it is desired to provide a method and system for automatically identifying a light source in an environment captured in an image that may cause damages to an imaging apparatus and protect the imaging apparatus from such identified light source.

SUMMARY

According to an aspect of the present disclosure, an apparatus is provided. The apparatus may include a processor and a storage device storing instructions. When executed by the processor, the instructions may cause the apparatus to perform operations. The operations may include receiving an infrared image of an environment captured by an imaging apparatus in a first configuration. The operations may include identifying, based on the infrared image, that a light source exists in the environment captured in the infrared image. The operations may include generating an order for changing the imaging apparatus from the first configuration to a second configuration.

In some embodiments, the apparatus may determine a grayscale level of each of a plurality of pixels in the infrared image. The apparatus may determine, the plurality of pixels based on the grayscale levels of the plurality of pixels, a set of target pixels from the plurality of pixels, wherein the grayscale of each of the set of target pixels satisfies a grayscale level condition. The apparatus may identify that the light source exists in the environment in response to the determination that the set of target pixels forms the target shape of the light source in the infrared image.

In some embodiments, the apparatus may determine a grayscale level of each of a plurality of pixels in the infrared image. The apparatus may determine, based on a shape detection algorithm, that the plurality of pixels form at least one target shape of the light source in the infrared image. The apparatus may determine a ratio of a count of pixels in the target shape that have grayscale levels satisfying a grayscale level condition to a total count of pixels in the target shape for each of the at least one target shape. The apparatus may determine that the ratio corresponding to one of the at least one target shape exceeds a ratio threshold. The apparatus may identify that the light source exists in the environment in response to the determination that the ratio corresponding to one of the at least one target shape exceeds the ratio threshold.

In some embodiments, the instructions may cause the apparatus to perform additional operations. The additional operations may include determining whether the identification of existence of the light source in the environment is a correct identification before generating the order for changing the imaging apparatus from the first configuration to the second configuration. The additional operations may include generating the order for changing the imaging apparatus from the first configuration to the second configuration in response to the determination that the identification of existence of the light source in the environment is a correct identification.

In some embodiments, the apparatus may receive at least one reference infrared image captured by the imaging apparatus in the first configuration, wherein the at least one reference infrared image is captured later than when the infrared image is captured by a time interval. The apparatus may identify that the light source exists in the environment captured in the reference infrared image. The apparatus may confirm that the identification of existence of the light source in the environment captured in the infrared image is a correct identification in response to the identification that the light source exists in the environment captured in the reference infrared image.

In some embodiment, the apparatus may determine at least one environment parameter associated with the light source at a time when the infrared image is captured. The apparatus may determine that the at least one environment parameter satisfies at least one environment condition. The apparatus may determine that the identification of existence of the light source in the environment captured in the infrared image is a correct identification in response to the determination that the at least one environment parameter satisfies the at least one environment condition.

In some embodiments, the infrared image may be captured by a thermal imaging device in the imaging apparatus when a shutter of the thermal imaging device is open, and the order for changing the imaging apparatus from the first configuration to the second configuration includes changing the shutter of the thermal imaging device from open to closed.

In some embodiments, the order for changing the imaging apparatus from the first configuration to the second configuration may include temporarily removing an optical filter of an imaging device in the imaging apparatus.

In some embodiments, the imaging apparatus may include at least one imaging device installed on a pan-tilt head, and the order for changing the imaging apparatus from the first configuration to the second configuration may include rotating the pan-tilt head to change the at least one imaging device in the imaging apparatus from a first orientation to a second orientation.

In some embodiments, the at least one imaging device may include a visible light imaging device and a thermal imaging device, and when the visible light imaging device and the thermal imaging device are configured along an axis, the order for changing the imaging apparatus from the first configuration to the second configuration may include rotating the pan-tilt head in a plane that is oblique or perpendicular to the axis.

According to another aspect of the present disclosure, a method may include receiving an infrared image of an environment captured by an imaging apparatus in a first configuration. The method may include identifying, based on the infrared image, that a light source exists in the environment captured in the infrared image. The method may include generating an order for changing the imaging apparatus from the first configuration to a second configuration.

According to another aspect of the present disclosure, a non-transitory computer readable medium embodying a computer program product is provided. The computer program product may include instructions configured to case a computing device to receive an infrared image of an environment captured by an imaging apparatus in a first configuration. The computer program product may include instructions configured to case a computing device to identify, based on the infrared image, that a light source exists in the environment captured in the infrared image. The computer program product may include instructions configured to generate an order for changing the imaging apparatus from the first configuration to a second configuration.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not drawn to scale. These embodiments are non-limiting exemplary embodiments, in which like reference numerals represent similar structures throughout the several views of the drawings, and wherein.

DETAILED DESCRIPTION

Figure 1:
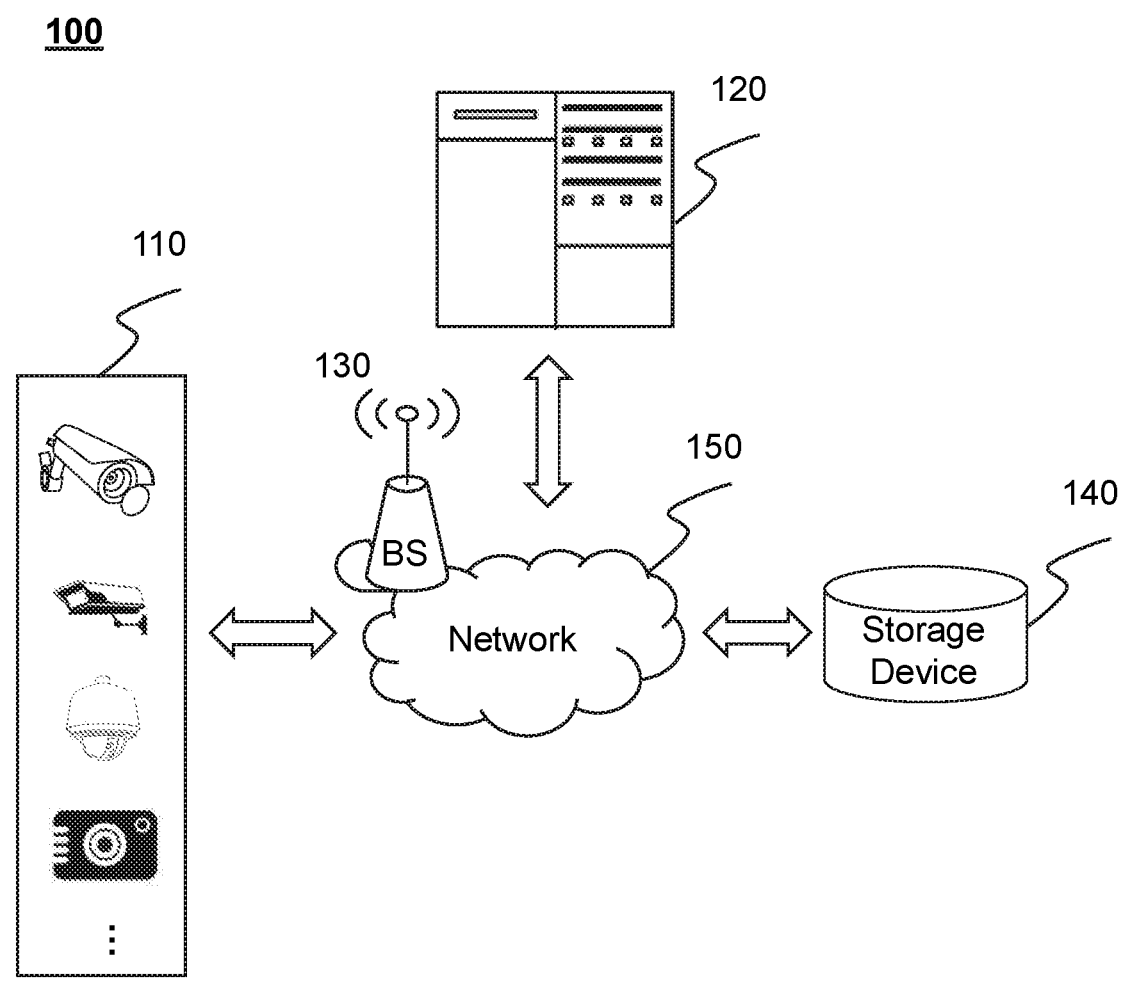
FIG. 1 is a schematic diagram of an exemplary imaging system 100 according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of portions and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

In order to make the purpose, technical solution, and advantages of the present disclosure clearer, the present disclosure will be further described in detail below with reference to the accompanying drawings and embodiments. It should be understood that the specific embodiments described herein are merely illustrative of the present disclosure and are not intended to limit the present disclosure.

Some embodiments of the present disclosure may be used in a situation that the imaging apparatus faces a high-intensity light source (e.g., the sun) that may damage some sensitive components (e.g., the infrared detector, the optical filter, etc.) of the imaging apparatus. An image processing device may detect the existence of the high-intensity light source based on an infrared image captured by the imaging apparatus or a portion thereof. The image processing device may generate an order to protect the imaging apparatus from the high-intensity light. For example, if the imaging apparatus is mounted on a pan-tilt head, the orientation of the imaging apparatus may be changed by rotating the pan-tilt head.

FIG. 1 is a schematic diagram of an exemplary imaging system 100 according to some embodiments of the present disclosure. As illustrated in FIG. 1, the imaging system 100 may include an imaging apparatus 110, an image processing device 120, a base station 130, a storage device 140, a network 150, and/or any other suitable component for processing images in accordance with various embodiments of the disclosure.

The imaging apparatus 110 may capture an image of an environment. The captured image may be an infrared image, image data, a visible light image, a grayscale image, etc. The captured image may include a plurality of pixels corresponding to infrared radiations or visible lights generated by at least one light source in the environment. In some embodiments, the imaging apparatus 110 may be any suitable device that is capable of generating an infrared image. For example, the imaging apparatus 110 may include an infrared camera, a thermal imaging sensor, an infrared image recorder, or the like, or any combination thereof. In some embodiments, the imaging apparatus 110 may include one or more cameras, such as a fixed camera, a fixed dome camera, a covert camera, a Pan-Tilt-Zoom (PTZ) camera, a thermal camera, etc. The imaging apparatus 110 may include a plurality of sensors, such as an imaging sensor, a temperature sensor, a light sensor, a wind speed sensor, or the like, or any combination thereof. The image(s) generated by the imaging apparatus 110 may be stored in the storage 140, and/or sent to the image processing device 120 via the network 150. In some embodiments, the imaging apparatus 110 may be connected with the image processing device 120 via the network 150. In some embodiments, the imaging apparatus 110 may be connected with the image processing device 120 directly as indicated by the dashed bidirectional arrow linking the imaging apparatus 110 and the image processing device 120 illustrated in FIG. 1.

The image processing device 120 may obtain an image generated by the imaging apparatus 110 or retrieved from any component in the imaging system 100 (e.g., the storage 140). The obtained image may be processed by the image processing device 120. For example, the image processing device 120 may determine whether a light source exists in the environment or scene captured in the obtained image. The image processing device 120 may further evaluate the correctness of the determination. In some embodiments, the image processing device 120 may be integrated with the imaging apparatus 110 to form an integrated component that may perform either or both of the functions of the image processing device 120 and the imaging apparatus 110. The image processing device 120 may generate an order based on the infrared image. The order may be used to control the imaging apparatus 110. For example, the order may be used to control the imaging apparatus 110 (e.g., a camera) to change its detecting direction. As another example, the order may be used to control the imaging apparatus 110 to change the configuration of a shutter (e.g., the position or orientation of a shutter) of the imaging apparatus 110.

The image processing device 120 may be any suitable device that is capable of analyzing an image (e.g., an infrared image) and generating, based on the analysis, an order regarding the configuration of the imaging apparatus 110. For example, the image processing device 120 may include a high-performance computing device specializing in data processing, a personal computer, a portable device, a server, a microprocessor, an integrated chip, a digital signal processor (DSP), a tablet computer, a personal digital assistant (PDA), or the like, or a combination thereof. In some embodiments, the image processing device 120 may be implemented on a computing device 200 shown in FIG. 2.

The network 150 may facilitate communications between various components of the imaging system 100. The network 150 may be a single network, or a combination of various networks. The network 150 may be a wired network or a wireless network. The wired network may include a Local Area Network (LAN), a Wide Area Network (WAN), a ZigBee™, or the like, or a combination thereof. The wireless network may include a Bluetooth™, a Near Field Communication (NFC), a wireless local area network (WLAN), Wi-Fi™, a Wireless Wide Area Network (WWAN), or the like, or a combination thereof. The network 150 may also include various network access points, e.g., wired or wireless access points such as the base stations 130 or Internet exchange points through which a data source may connect to the network 150 to transmit data via the network 150.

The storage device 140 may store data, image related information or parameters. The data may include an infrared image (e.g., an infrared image obtained by the imaging apparatus 110), a grayscale image and/or communication data. The image related information may include a feature (e.g., pixel values) related to object(s) (e.g., the sun) in the image, frequency domain information of the image, etc. The image related parameter may include an intrinsic parameter (e.g., a focal length, a lens distortion parameter), and/or an extrinsic parameter (e.g., the pose of a camera, a position parameter of the camera) of the imaging apparatus 110 (e.g., camera) that generates or capture the image.

It should be noted that the descriptions above of the imaging system 100 is provided for the purposes of illustration, and not intended to limit the scope of the present disclosure. For persons having ordinary skills in the art, various variations and modifications may be conducted under the guidance of the present disclosure. However, those variations and modifications shall not depart the scope of the present disclosure. In some embodiments, the storage device 140 may be combined with the image processing device 120 as a single device. Similar modifications should fall within the scope of the present disclosure.

Figure 2:
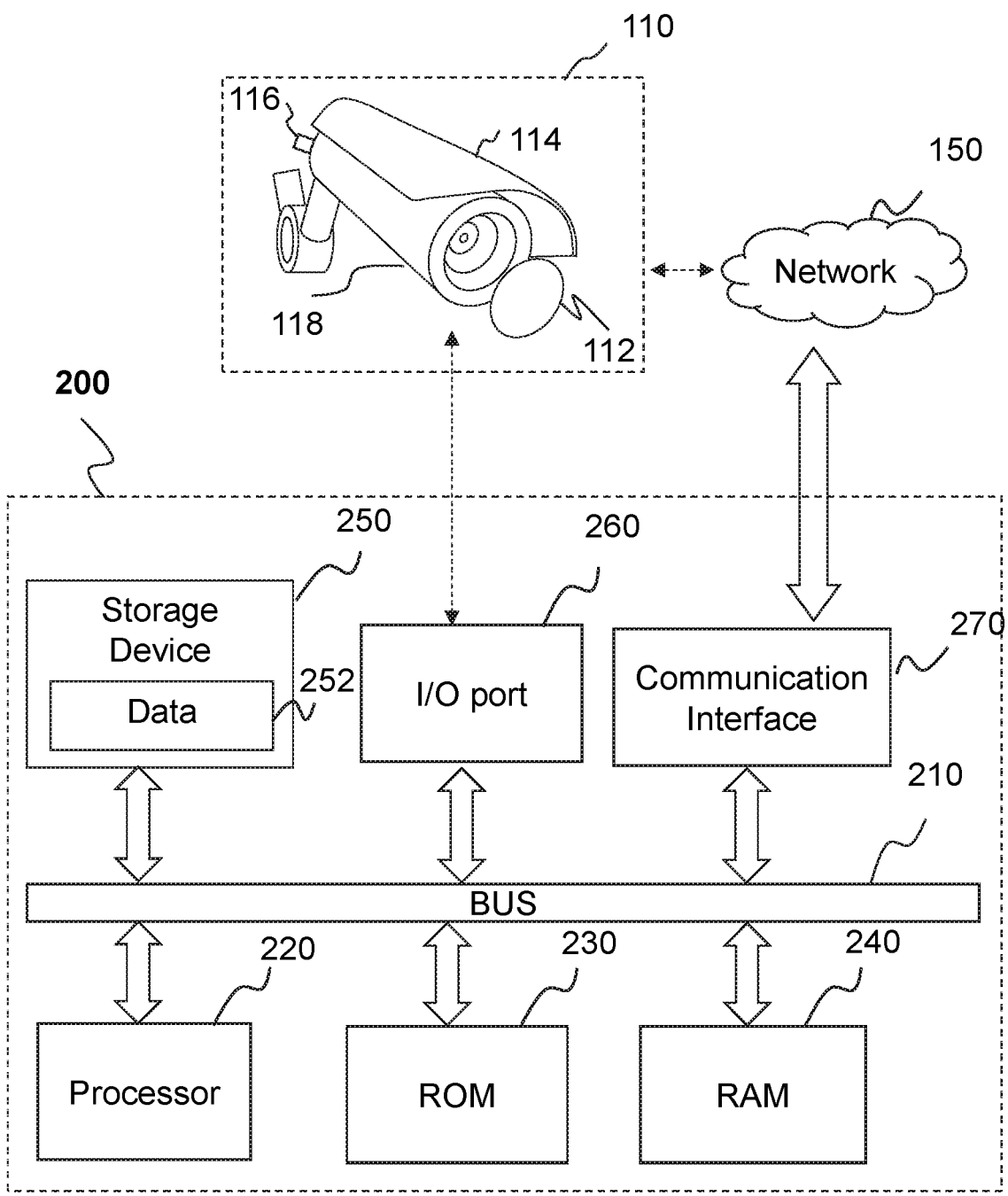
FIG. 2 is a schematic diagram of an exemplary computing device according to some embodiments of the present disclosure.

FIG. 2 is a schematic diagram of an exemplary computing device according to some embodiments of the present disclosure. One or more components of imaging system 100 (e.g., image processing device 120) may be implemented in computing device 200, which may be configured to perform one or more functions of imaging system 100 (e.g., one or more functions of image processing device 120) disclosed in this disclosure. Computing device 200 may include a bus 210, a processor 220, a read only memory (ROM) 230, a random access memory (RAM) 240, a storage device 250, an input/output port 260, and a communication interface 270.

The imaging apparatus 110 may include an infrared camera 116 and/or a visible light camera 118 with an optical filter 112. The imaging apparatus 110 may include a protective cover 114. In some embodiments, the computing device 200 may be a single device. Alternatively, the computing device 200 may include a plurality of devices. One or more components of the computing device 200 may be implemented by one or more independent devices. For example, the processor 220 and the storage device 250 may be implemented in a same device. Alternatively, the processor 220 and the storage device 250 may be implemented in different devices, and the processor 220 may access the storage device 250 through wired or wireless connection (via, for example, the network 150).

Bus 210 may couple various components of computing device 200 and facilitate the transfer of data between them. Bus 210 can be any bus structure, including, for example, a memory bus or memory controller, a peripheral bus, and a local bus using any of a variety of bus architectures.

I/O port 260 may be configured to allow the transfer of data between computing device 200 and other components of imaging system 100 (e.g., imaging apparatus 110). I/O port 260 may include a Universal Serial Bus (USB) port, a Component Object Mode (COM) port, PS/2 port, High Definition Multimedia Interface (HDMI) port, Video Graphics Array (VGA) port, or the like. Communication interface 270 may allow transfer of data between network 150 and computing device 200. Communication interface 270 may be a network interface card (NIC).

Processor 220 may include any general-purpose processor configured to perform one or more functions of the computing device 200 disclosed in this disclosure. The processor 220 may contain multiple cores or processors, cache, etc. A multicore processor can be symmetric or asymmetric. The processor 220 may essentially be a completely independent computing system with similar structure as computing device 200. The processor 220 may receive the infrared image from the imaging apparatus 110. The processor 220 may identify the existence of a light source in the infrared image. To improve the accuracy of the identification, the processor 220 may exclude some false identifications. The processor 220 may change the imaging apparatus 110 from a first configuration to a second configuration.

ROM 230, RAM 240, and storage device 250 may be configured to store data, e.g., data 252. ROM 230 may store a basic input/output (BIOS) which may provide the basic routine that helps to transfer information between devices/components within computing device 200, such as during initializing of a computer operating system. Storage device 250 may provide nonvolatile storage for data 252. Storage device 250 may connect to bus 210 through a drive interface. Storage device 250 may include a hard disk, a solid state disk (SSD), a flash memory card, a magnetic disk drive, an optical disk drive, tape drive, or the like.

ROM 230, RAM 240, and/or storage device 250 may store computer readable instructions that can be executed by processor 220 to perform one or more functions disclosed in this disclosure (e.g., the functions of image processing device 120, imaging apparatus 110). Computer readable instructions may be packaged as a software or firmware. Data structures may include a tree structure, a linked list, a neural network, a graph structure, or the like, or their variants, or the combination thereof. Temporary data may be data generated by processor 220 when processor 220 performs computer readable instructions.

Data 252 may include raw imaging data or code implementing computer readable instructions, data structures, images, temporary data, and others. Data 252 may be transferred through bus 210 to RAM 240 before being processed by processor 220.

Figure 3:
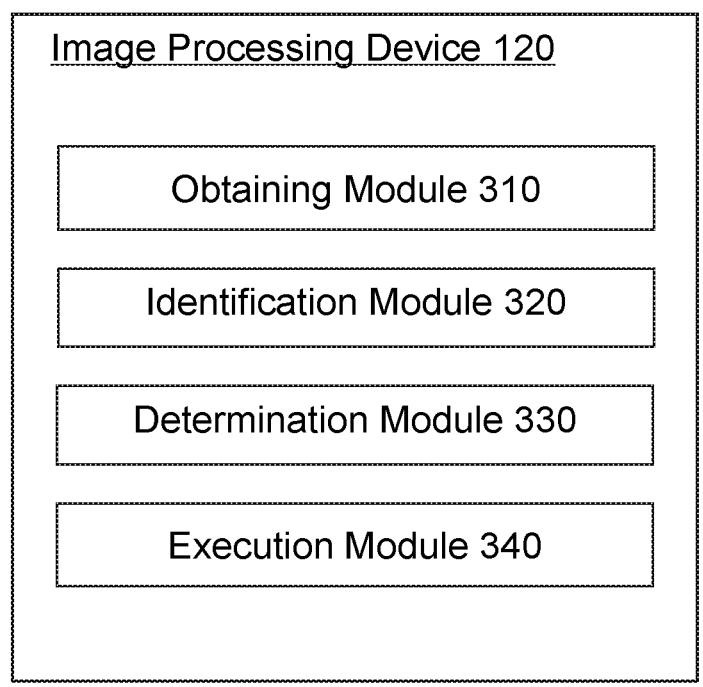
FIG. 3 is a block diagram illustrating an exemplary image processing device according to some embodiments of the present disclosure.

FIG. 3 is a schematic diagram illustrating an exemplary image processing device according to some embodiments of the present disclosure. As shown in FIG. 3, the image processing device 120 may include an obtaining module 310, an identification module 320, a determination module 330, and an execution module 340.

The obtaining module 310 may be configured to receive an infrared image of an environment captured by an imaging apparatus 110 in a first configuration. The imaging apparatus 110 may include at least one thermal imaging apparatus. The thermal imaging apparatus may generate the infrared image according to a thermal imaging sensor (e.g., an infrared detector). The first configuration may be a normal configuration under which the imaging apparatus 110 captures an infrared image. The obtaining module 310 may send the infrared image of the environment to the identification module 320.

The identification module 320 may be configured to determine whether a light source exists in the environment captured in the infrared image. Exemplary light sources may include a human body, an animal, a vehicle, an electric wire, the sun, a steel making furnace, a light bulb, a lighting fixture, etc. The identification module 320 may determine the temperature of one or more objects in the monitored environment captured in the infrared image. The identification module 320 may determine, e.g., grayscale levels of a plurality of pixels in the infrared image, the shape of a group of pixels having similar grayscale levels, or the like. After analyzing the grayscale levels and the shape, the identification module 320 may identify the existence of the light source in the environment captured in the infrared image.

The determination module 330 may be configured to determine whether the identification that the light source exists in the environment (e.g., the identification performed by the identification module 320) is a correct identification. The determination module 330 may improve the accuracy of the identification. After the identification module 320 identifies a candidate light source, the determination module 330 may determine one or more parameters including, e.g., the current time, weather, and the duration of the existence of the candidate light source and determine whether the identification of the light source is a correct identification based on one or more such parameters.

The execution module 340 may be configured to generate an order for changing the imaging apparatus 110 from the first configuration to a second configuration. The aim of the order may be to protect the imaging apparatus 110 from damages by a destructive light source. The execution module 340 may change at least one components of the imaging apparatus 110 to avoid the danger of such damages. The execution module 340 may determine a current configuration (or referred to as a first configuration) of the imaging apparatus 110 that may cause the imaging apparatus 110 to change from the current configuration to a second configuration based on the generated order.

Figure 4:
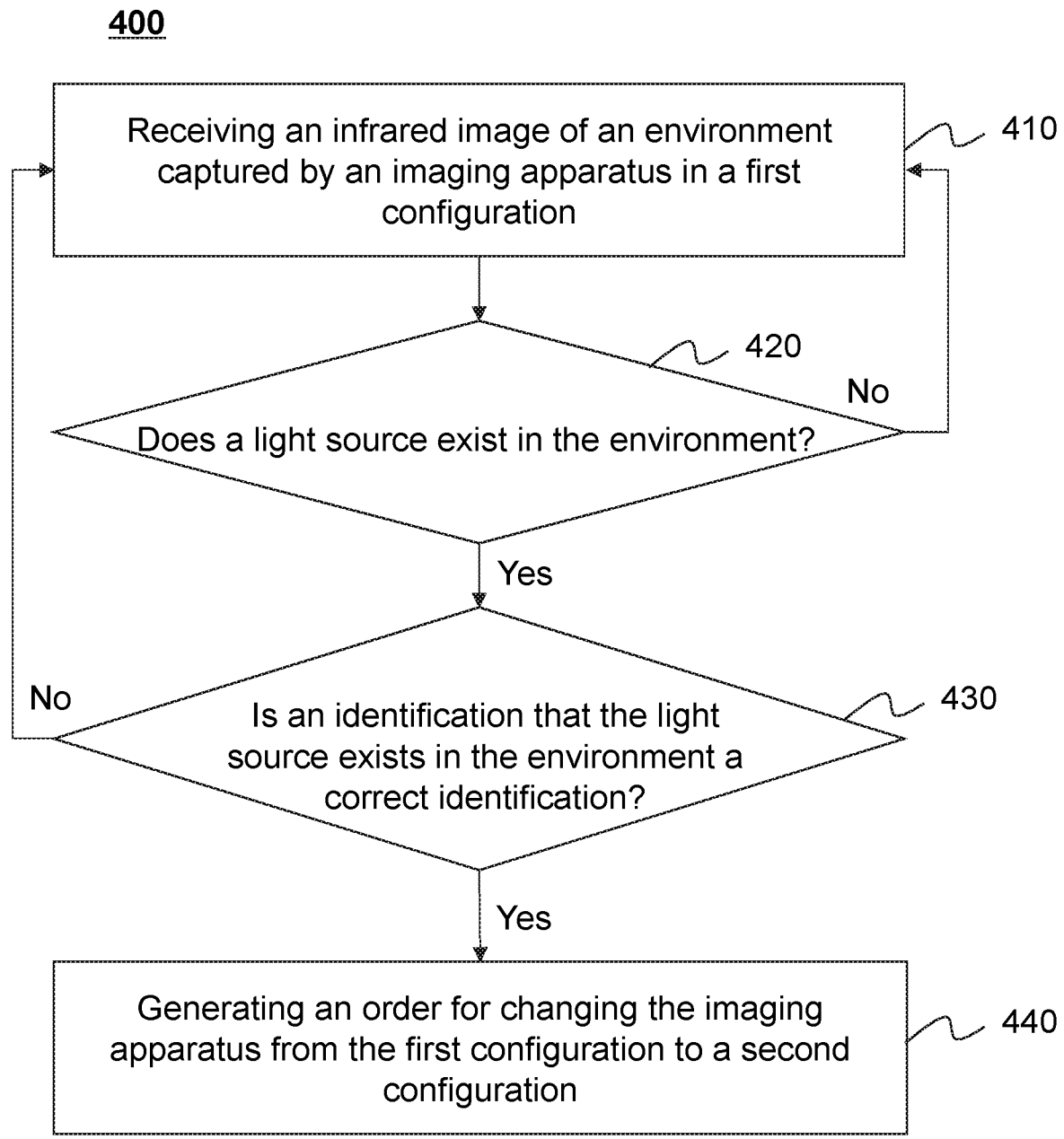
FIG. 4 is a flowchart illustrating an exemplary process for generating an order for changing the configuration of the imaging apparatus according to some embodiments of the present disclosure.

FIG. 4 is a flowchart illustrating an exemplary process for generating an order for changing the configuration of an imaging apparatus according to some embodiments of the present disclosure. In some embodiments, process 400 may be implemented on the image processing system 100 as illustrated in FIG. 1. For example, the process 400 may be stored in a storage medium (e.g., the storage 140, the storage device 250 of the computing device 200) in the form of instructions, and invoked and/or executed by the image processing device 120. The operations in the process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below are not intended to be limiting.

In 410, the obtaining module 310 may receive an infrared image of an environment captured by an imaging apparatus in a first configuration. The imaging apparatus 110 may include at least one thermal imaging device. The at least one thermal imaging device may include an infrared camera, a binocular imaging device including both an infrared camera (e.g., the infrared camera 116) and a visible light camera (e.g., the visible light camera 118), a visible light camera with a thermal imaging sensor, or the like, or any combination thereof. The visible light camera 118 may have a threshold component (e.g., an optical filter) to attenuate at least a portion (e.g., a particular color or group of colors) of received visible light(s) to a lower level such that the attenuated portion of the received visible light cannot be detected by the visible light camera 118. The thermal imaging sensor may include an infrared detector (e.g., the infrared detector 116) that reacts to infrared radiation (s) to generate voltage change(s). In some embodiments, the infrared detector 116 may detect and/or measure the infrared energy of an object based on the voltage changes. The infrared detector 116 may be made of vanadium oxide, mercury cadmium telluride, indium arsenide, polysilicon or the like, or any combination thereof. The infrared detector 116 may be a polysilicon detector.

The image processing device 120 may focus infrared energy of an object onto an infrared detector chip that contains a plurality of detector pixels arranged in a grid. Each detector pixel may react to the infrared energy focused on it and produce an electronic signal. The image processing device 120 may take the signal from each pixel and apply a mathematical calculation to it to create a color map of the apparent temperature of the object (different temperature values may be assigned different colors). The color map may be sent to the storage device 250 and/or to the I/O port 260. In some embodiments, a grayscale image may be generated based on the color map. For example, the grayscale image may be generated by converting the color at each detector pixel to a grayscale value. Merely by way of example, the color map or the grayscale image may correspond to an infrared energy distribution of objects in the environment captured by the imaging apparatus 110. Unlike a normal black-and-white image, the infrared grayscale image may be composed exclusively of shades of gray varying from black at the weakest intensity to white at the strongest intensity. The infrared energy of the objects in the environment may be proportional to the temperature of the objects. If the temperature of an object is high, the corresponding grayscale value in the grayscale image may be large (e.g., whiter). Specifically, the grayscale value of pixels of the sun in a grayscale image may be close to a saturated value (or maximum value) of the grayscale image. For example, the corresponding grayscale value of pixels corresponding to the sun may be approximately 16383 in a 14-bit grayscale image, which may be higher than the majority of other objects. The appearance of pixels corresponding to the sun may be almost white in the 14-bit grayscale image. In some embodiments, the grayscale image may be generated directly by the infrared detector 116. For example, the infrared detector 116 may measure infrared energy based on the infrared radiation spectrum of an object. The infrared radiation spectrum of an object may show characteristic dips and peaks when photons are absorbed or emitted by electrons in molecules as they transition between orbits, or energy levels. The infrared detector 116 may measure the intensity of each pixels to generate the grayscale image.

The first configuration of the imaging apparatus 110 may be a normal configuration under which the imaging apparatus 110 captures an infrared image of an environment or scene. In some embodiments, the imaging apparatus 110 may include the infrared detector 116. For example, under the first configuration of the imaging apparatus 110, a shutter of the infrared detector 116 may be open. In some embodiments, the imaging apparatus 110 may have a protective cover 114, and under the first configuration the protective cover 114 may be not in use, e.g., folded up on the top or bottom surface of the imaging apparatus 110, retracted, or the like. In some embodiments, the imaging apparatus 110 may be installed on a pan-tilt head (e.g., pan-tilt head 803 as shown in FIG. 8), and under the first configuration the pan-tilt head may be at a first position (e.g., a position such that the imaging apparatus 110 orients toward the environment or scene it monitors). The imaging apparatus 110 may further include a visible light imaging device configured to capture visible light images. Under the first configuration of the imaging apparatus 110, an optical filter of the visible light imaging device may be in use, e.g., placed between the lens of the visible light imaging device and the environment an image of which the visible light imaging device may capture.

In 420, the identification module 320 may determine whether a light source exists in the environment. For example, the light source may include both natural and artificial objects that emit infrared light and energy. Exemplary light sources may include a human body, an animal, a vehicle, a nuclear reactor, a steel making furnace, an electric wire, the sun, etc. In some embodiments, the "light source" may be a specific term used in this disclosure as a reference to an infrared light emitting object that satisfies a preset condition (an object in the environment that does not satisfy the preset condition(s) may simply be referred to as an "object" and not processed in operations 420-440). The preset condition(s) may be related to the temperature and/or the grayscale value of the object in the grayscale image. For example, the preset condition may include that the temperature and/or grayscale of the object being greater than, less than, or equal to a specific value or within a range of values. If the temperature and/or the grayscale satisfies the present condition(s), the identification module 320 may identify the object as the light source. The preset condition may further include that the shape of the object in the infrared image matching with a preset shape. The preset shape may include a circle, a triangle, a rectangle, a polygon, a bar, a curve, or the like, or any combination thereof. Merely by way of example, the light source may be the sun. The grayscale value of the sun may be 16383 in a 14-bit grayscale image.

Merely by way of example, for a 14-bit grayscale image (e.g., a grayscale image of which each pixel can take a value from zero to $2^{14}-1$), the preset condition may include the grayscale value being greater than 15563 (16383*0.9≈15563) and the shape being circular.

As another example, the imaging system 100 may be used to monitor a steel factory, e.g., to protect raw materials (e.g., iron ores) or products (e.g., steel) from being stolen or damaged, or to monitor personnel working onsite. When monitoring the steel making factory, the imaging apparatus 110 of the imaging system 100 may change the detecting direction and orient toward a steeling making furnace which is at a high temperature (e.g., about 1600-1800 degrees Celsius). In this case, the light source may be a steel making furnace in a steel making factory. The steel making furnace may be a cylindrical tank containing molten iron and/or other materials. The grayscale value of the steel making furnace may typically be about 5000 in a 14-bit grayscale image. Merely by way of example, for a 14-bit grayscale image, the preset condition may include the grayscale value being greater than 4500 (5000*0.9=4500) and the shape being rectangular (when the image is captured from a side of the steel making furnace), circular (when the image is captured from the top of the steel making furnace), or a shape formed by two arcs and two straight lines (when the image is captured from an oblique direction). In order to distinguish the steel making furnace from the environment, the preset temperature condition may include the grayscale value being greater than 4500 and less than 6000.

In response to the determination that a light source exists in the environment, the process 400 may proceed to 430; otherwise, the process 400 may return to 410. In 410, the obtaining module 310 may repeatedly obtain anew infrared image to determine if a light source of interest exists in the environment captured in the new infrared image. More descriptions regarding the light source identification may be found elsewhere in the present disclosure, e.g., FIG. 6 and FIG. 7.

In 430, the determination module 330 may determine whether the identification that the light source exists in the environment (e.g., the identification preformed in 420) is a correct identification. In some embodiments, the determination module 330 may obtain at least one preset condition of the light source and/or the environment. For example, the at least one preset condition may include the duration of light emission from the light source, the duration that the light source exists in the environment, weather in the environment, etc. For example, if the light source that the imaging apparatus 110 intends to identify normally emits light continuously, the identification of a light source that emits light temporarily or sporadically (e.g., lasting for a few milliseconds) may be a false identification. Merely by way of example, the light source may be the sun. The initial identification of the sun as a light source in the environment by the identification module 320 may be double checked based on duration of light emission from the identified light source, current weather in the environment when the image is captured, a current time when the image is captured, or the like, or any combination thereof. For example, after the identification module 320 identifies a candidate light source with high grayscale values and a round shape as the sun (or a candidate sun), the determination module 330 may determine the current time, current weather condition, and the duration of the candidate light source emitting light or energy. Specifically, if the current time is 06:00 or 22:00 (or any time that the sun does not normally appear depending on the latitude of the location where the imaging system 100 is installed), an identification of the sun in the infrared image may be deemed a false identification. If the weather is cloudy or snowy (or any weather that the sun does not normally appear), the identification may be deemed false. If the duration of the candidate light source is less than a threshold (e.g., 10 minutes), the identification may be deemed false. As another example, after the identification module 320 identifies a candidate light source with high grayscale values and a target shape (as mentioned in 420 and the descriptions thereof) as the steel making furnace (or a candidate steel making furnace), the determination module 330 may determine the current time, the current operating status of the steel making factory (either it is open or closed), and the duration of the candidate light source emitting light or energy. Specifically, if the current time is 3:00 or 23:00 (or any time that the steel making furnace does not normally operate), an identification of the steel making furnace in the infrared image may be deemed a false identification. If the steel making factory is closed, the identification may be deemed false. If the duration of the candidate light source is less than a threshold (e.g., 1 minute), the identification may be deemed false. In response to a correct identification, the process 400 may proceed to 440; otherwise, the process 400 may return to 410. In 410, the obtaining module 310 may obtain a new infrared image to determine if a light source of interest exists in the environment captured in the new infrared image.

In 440, the execution module 340 may generate an order for changing the imaging apparatus from the first configuration to a second configuration. For example, if the light source is determined to be the sun, strong sunlight may destroy or damage some sensitive components in the imaging apparatus 110. It is understood that the sun is provided as an example for illustration purposes, and the light source of interest may be another object (e.g., a steel making furnace) that provides high-intensity light or energy that may damage the imaging apparatus 110 or a portion thereof. The first configuration may be a normal configuration under which the imaging apparatus captures an infrared image of an environment or scene. In some embodiments, under the first configuration, the imaging apparatus 110 may receive infrared light in a first detecting direction. When the sun is identified to exist in the environment captured in the infrared image, the order may include changing the imaging apparatus 110 to a second configuration under which the imaging apparatus 110 is configured at a second detecting direction. In some embodiments, the shutter of the infrared detector 116 may be open under the first configuration while closed under the second configuration of the imaging apparatus 110. In some embodiments, the imaging apparatus 110 may include the protective cover 114, and under the second configuration, the protective cover 114 may be in use, e.g., covering and protecting the imaging apparatus 110. In some embodiments, the imaging apparatus 110 may be mounted on a pan-tilt head, and under the second configuration the pan-tilt head may be at a second position (e.g., a position such that the orientation of the imaging apparatus 110 and/or any camera thereof may be oriented away from the light source). In some embodiments, the imaging apparatus 110 may further include a visible light camera 118 with an optical filter (e.g., the optical filter 112) configured to capture visible light images. Under the second configuration, the optical filter 112 of the visible light camera 118 may be retracted or otherwise not in its working position. In some embodiments, a change of the configuration of the imaging apparatus 110 may include an adjustment of a detecting direction, a shutter, a protective cover (e.g., the protective cover 114), a pan-tilt head, or the like, or a combination thereof.

In some embodiments, the identified light source does not continuously exist in the environment at a high infrared light strength (or temperature). For example, the sun does not exist in the environment (or may not be identified in the infrared image of the environment) at night or before dawn. As another example, when it begins to rain or becomes cloudy, the strength of infrared light(s) of the sun detectable in the environment may be significantly reduced, e.g., to a level that is not harmful to the imaging apparatus 110. After changing the imaging apparatus 110 from the first configuration to the second configuration, the execution module 340 may generate temporary order(s) for temporarily changing the imaging apparatus 110 from the second configuration to a third configuration.

The third configuration may be the same as or different from the first configuration. For example, the third configuration may be the same as the first configuration except that one or more components of the imaging apparatus 110 work at a different mode compared to the imaging apparatus 110 under the first configuration. As an example, the visible light camera 118 does not work under the third configuration, the infrared camera 116 works under a different setting (shutter being only partially open, not directly facing the identified light source but away from the identified light source by an angle) the third configuration compared to the first configuration. In some embodiments, under the third configuration, the infrared camera 116 may function when the shutter is only partially open, when the infrared camera 116 does not directly face the identified light source but face a direction away from the identified light source by an angle, or the like, or a combination thereof. The imaging apparatus 110 may capture a test infrared image when changed to the third configuration. The determination module 430 may process the test infrared image and determine whether the identified light source still exists in the environment, whether a new light source that may damage the imaging apparatus 110 or a portion thereof exists in the environment, and/or whether the grayscale value of the identified light source in the test infrared image drops below a preset grayscale value (e.g., the grayscale value in the preset condition as mentioned in 420).

When it is determined that the identified light source remains in the environment at a high infrared light strength (e.g., may still damage the imaging apparatus 110 or a portion thereof) or a new light source that may damage the imaging apparatus 110 or a portion thereof is identified in the environment, the execution module 440 may generate an order for changing the imaging apparatus 110 from the third configuration back to the second configuration. When it is determined that the identified light source no long exists in the environment, or the grayscale value of the identified light source in a test infrared image is below a preset grayscale value (e.g., no longer damages the imaging apparatus 110), and no new light source that may damage the imaging apparatus 110 or a portion thereof is identified in the test infrared image, the execution module 340 may generate an order to change the imaging apparatus 110 from the third configuration to the first configuration. In some embodiments, the temporary order(s) may be generated after the imaging apparatus 110 is changed from the first configuration to the second configuration in 440. In some embodiments, according to the temporary order, the imaging apparatus 110 to may acquire a test infrared image periodically at a time interval. The intervals may include but not limited to one minute, 10 minutes, 30 minutes, one hour, four hours, etc. Alternatively or additionally, information acquired by one or more sensors may be used to set the configuration of the imaging apparatus 110. The one or more sensors may include but not limited to an imaging sensor, a thermometer, a light sensor, a wind speed sensor, a humidity sensor, a rain sensor, etc. For example, when a thermometer records a decrease in temperature and the humidity sensor records an increase in humidity, the determination module 330 may determine that it starts to rain, and cause the execution module 340 to generate the temporary order for changing the imaging apparatus 110 to the third configuration.

It should be noted that the above description of process 400 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protection of some embodiments of the present disclosure. For example, one or more other optional operations (e.g., calculation operation) may be added in the exemplary process 500. In the calculation operation, the identification module 320 may calculate the temperature of objects in the monitoring environment according to the grayscale image.

Figure 5:
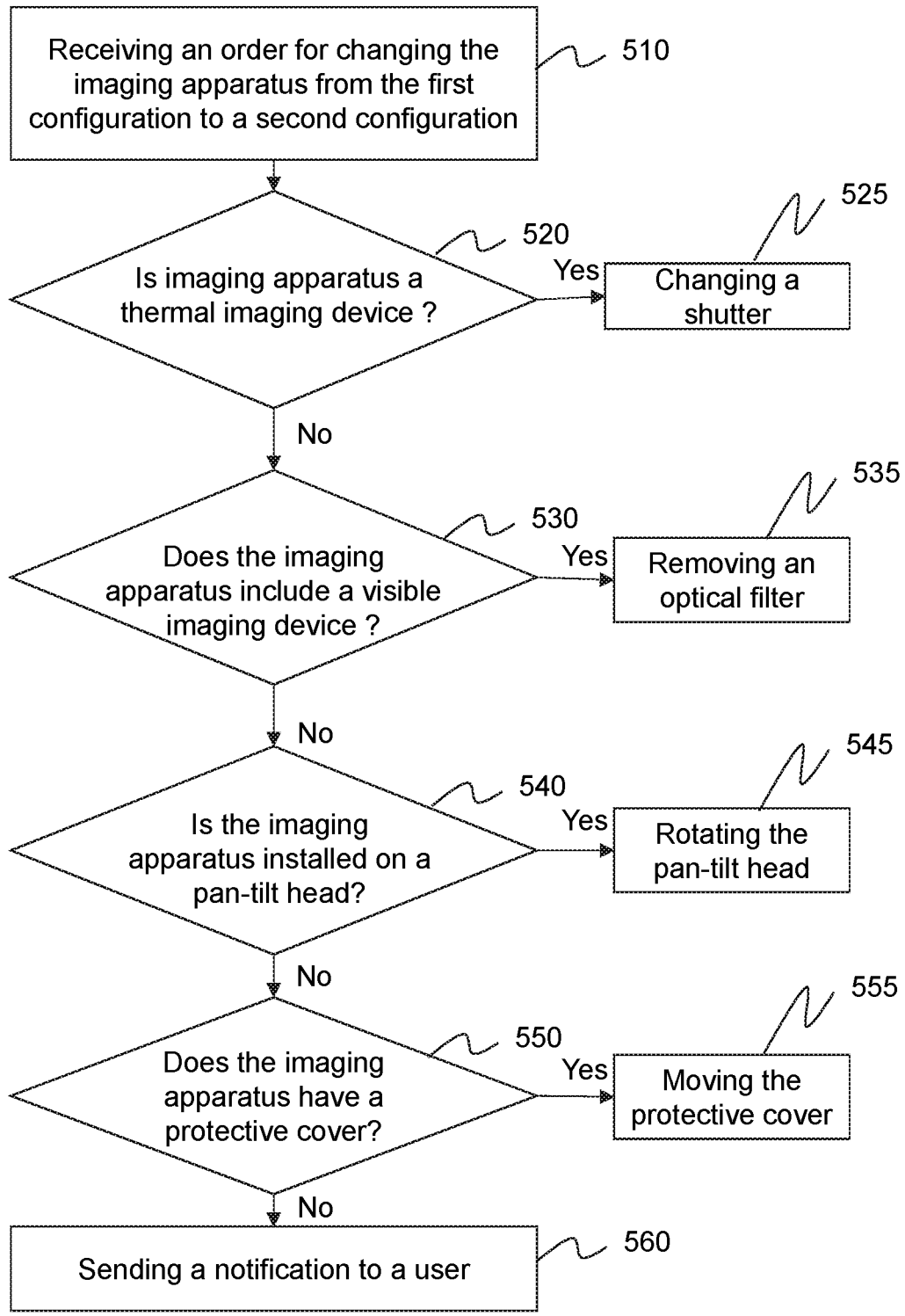
FIG. 5 is a flowchart illustrating an exemplary process for changing the configuration of the imaging apparatus based on the order according to some embodiments of the present disclosure.

FIG. 5 is a flowchart illustrating an exemplary process for changing the configuration of the imaging apparatus based on the order according to some embodiments of the present disclosure. In some embodiments, the process 500 may be implemented on the image processing system 100 as illustrated in FIG. 1. For example, the process 500 may be stored in a storage medium (e.g., the storage 140, or the storage device 250 of the computing device 200) in the form of instructions, and invoked and/or executed by the image processing device 120. The operations in the process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below are not intended to be limiting.

In 510, the obtaining module 310 may receive an order for changing the imaging apparatus from the first configuration to a second configuration. The order for changing the imaging apparatus 110 from the first configuration to a second configuration may be generated by operation 440. In some embodiments, the order for changing imaging apparatus from the first configuration to the second configuration may be generated after a light source (e.g., the sun) is deemed to exist in the environment captured in an infrared image captured by the imaging apparatus 110. The order may be implemented by the imaging apparatus 110 and/or the execution module 340 to change at least one component in the imaging apparatus 110 such that the danger of damages by the identified light source to the imaging apparatus 110 may be reduced or avoided.

In 520, the determination module 330 may determine whether the imaging apparatus is a thermal imaging device. The thermal imaging device may include an infrared camera and/or a visible light camera 118 with an infrared detector 116. When the thermal imaging device is exposed to high-intensity light sources (e.g., the sun, the steel making furnace) for a long time, high temperature may cause irreversible damage to the thermal imaging device (e.g., the infrared detector 116). In response to the determination that the imaging apparatus 110 is a thermal imaging device, process 500 may proceed to 525; otherwise, process 500 may proceed to operation 530. In 525, the execution module 340 may change a shutter of the thermal imaging device from open (e.g., the first configuration) to closed (e.g., the second configuration). It should be noted that in some cases the imaging apparatus 110 may be a thermal imaging device that does not include any shutter or the shutter cannot be changed. In these cases, process 500 may also proceed to 530.

In 530, the determination module 330 may determine whether the imaging apparatus 110 includes a visible light imaging device. The visible light imaging device may include a visible light camera 118. In some embodiments, an optical filter may be used in the visible light camera 118. The optical filter may transmit light of different wavelengths selectively. Long exposures against light sources (e.g., the sun, the steel making furnace) may cause permanent damage to the optical filter. In response to the determination that the imaging apparatus 110 includes a visible light imaging device, process 500 may proceed to operation 535; otherwise, process 500 may proceed to operation 540. In 535, the execution module 340 may move the optical filter from a first configuration (e.g., a first position where visible light from the environment transmits through or a first position between visible light lens and the environment) to a second configuration (e.g., a second position where visible light from the environment does not transmit through or a second position that is not between the visible light lens and the environment). It should be noted that in some cases the imaging apparatus 110 may include a visible light imaging device that does not include any optical filter or the optical filter cannot be moved. In these cases, process 500 may proceed to 540.

In 540, the determination module 330 may determine whether the imaging apparatus 110 is installed on a pan-tilt head. The pan-tilt head may be a pivoted support that allows multi-directional rotations of the imaging apparatus 110. The pan-tilt head may be caused to rotate the imaging apparatus 110 automatically controlled by the execution module 340 or manually via a user instruction through communication interface 270. In response to the determination that the imaging apparatus 110 is installed on the pan-tilt head, the process 500 may proceed to 545; otherwise, the process 500 may proceed to 550. In 545, the execution module 340 may rotate the pan-tilt head from a first orientation (e.g., the first configuration) to a second orientation (e.g., the second configuration) to change the detecting direction n of the imaging apparatus 110. In some embodiments, the arrangement of the imaging apparatus 110, e.g., the positions of cameras of the imaging apparatus 110 may result in a different rotation direction of the pan-tilt head. More descriptions regarding the rotation directions of the pan-tilt head may be found elsewhere in the present disclosure, e.g., FIG. 8 and the descriptions thereof. It should be noted that in some cases the imaging apparatus 110 may be installed on a pan-tilt head that cannot be rotated or the rotation of the pan-tilt head is not enough to protect the imaging apparatus 110 away from identified light source. In these cases, process 500 may proceed to 550.

In 550, the determination module 330 may determine whether the imaging apparatus 110 has a protective cover. The protective cover may be a foldable, retractable, and/or detachable cover that can protect the imaging apparatus from damage by a light source. In response to the determination that the imaging apparatus 110 has the protective cover, process 500 may proceed to 555; otherwise, process 500 may proceed to 560. In 555, the execution module 340 may change the protective cover from a first configuration (e.g., not in use, folded up on the top or bottom surface of the imaging apparatus 110, retracted, or detached from the imaging apparatus 110 or a portion thereof) to a second configuration (e.g., being in use, extended, attaching to or covering the imaging apparatus 110 or a portion thereof). It should be noted that in some cases the imaging apparatus 110 may have a protective cover but the protective cover cannot be used or the protective cover is not sufficient to protect the imaging apparatus 110. In these cases, process 500 may proceed to 560.

In 560, the execution module 340 may send a notification to a user. The notification may include information notifying the existence of a light source. The notification may notify the user to investigate the environment and/or adjust the imaging apparatus 110, e.g., manually (by providing a user instruction to cause an adjustment of the apparatus 110 or a portion thereof, or directly adjusting the imaging apparatus 110 or a portion thereof manually). Meanwhile, the execution module 340 may send image(s) captured to the user such that the user may evaluate whether the light source exists in the image(s). The evaluation or adjustment of the user may be provided to the determination module 330 to improve the accuracy of subsequent determinations made by the determination module 330. The execution module 340 may send the notification to the user's mobile computing device, tablet computer, laptop computer, smart home service, desktop computer or the like, or any combination thereof via the network 150. The mobile computer may include a wearable device, a mobile phone, a personal digital assistant (PDA), or the like, or any combination thereof.

In some embodiments, one or more operations may be added or omitted. For example, operations 520 and 530 may be merged into one operation or performed essentially simultaneously as two parallel operation. As another example, a post-processing operation may be added after 560. The user may individually perform operations 525, 535, 545, and/or 555. In some embodiments, the order of the operations in process 500 may be changed. For example, operations 520 to 520 may be performed simultaneously or in any order. In some embodiments, at least two operations of 525, 535, 545, or 555 may be performed cumulatively. Merely by way of example, after 525 is performed, the process 500 may proceed to any one of 530, 540, 550 to check whether one or more additional protective operations of 535, 545, or 555 may be performed. The order of the operations may be changed. Merely by way of example, 530 and 535 directed to the optical filter may be performed before 520 and 525 directed to the shutter.

Figure 6:
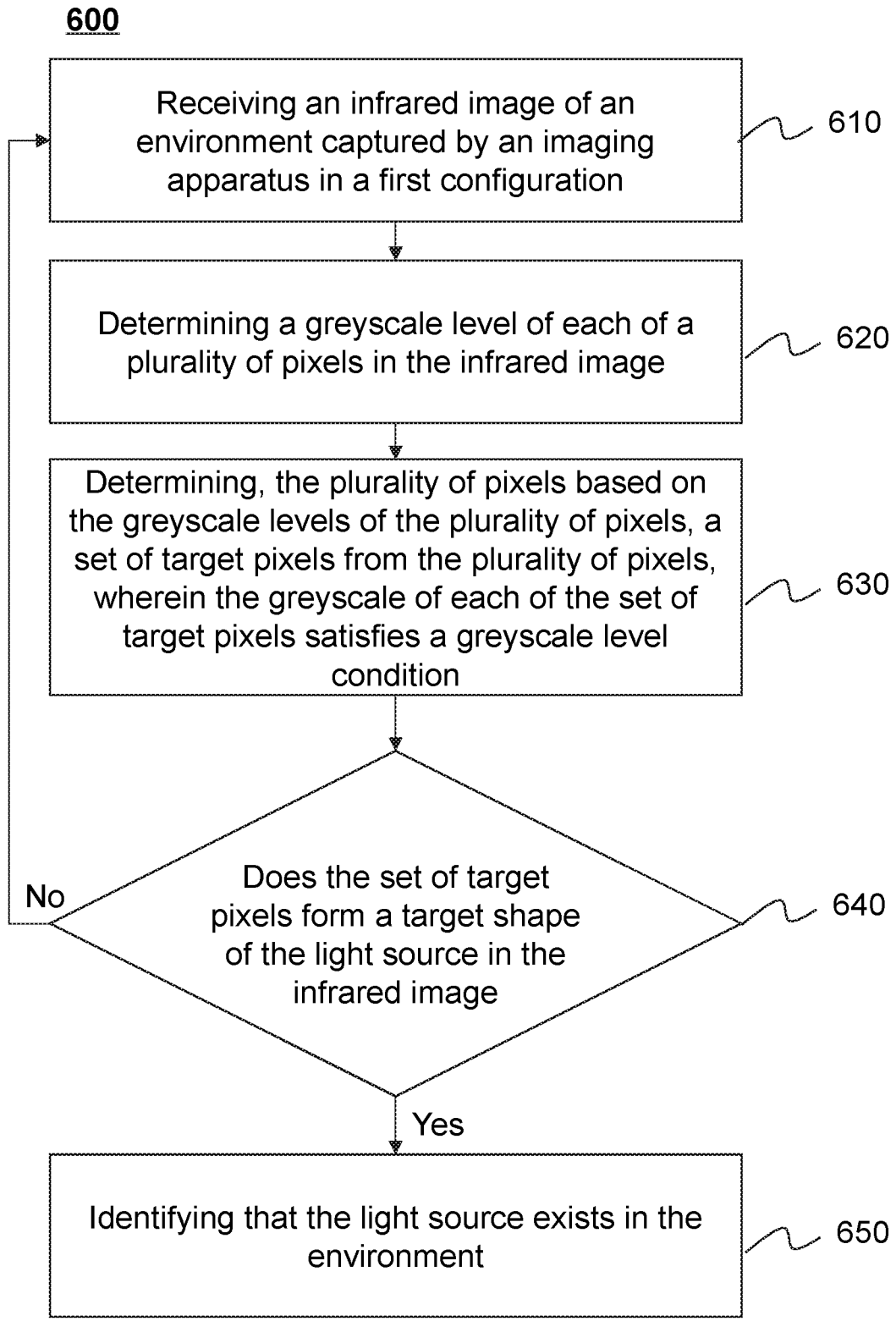
FIG. 6 is a flowchart illustrating an exemplary process for identifying a light source in an environment according to some embodiments of the present disclosure.

FIG. 6 is a flowchart illustrating an exemplary process for identifying a light source in an environment according to some embodiments of the present disclosure. In some embodiments, the process 600 may be implemented on the image processing system 100 as illustrated in FIG. 1. For example, the process 600 may be stored in a storage medium (e.g., the storage 140, or the storage device 250 of the computing device 200) in the form of instructions, and invoked and/or executed by the image processing device 120. The operations in the process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below are not intended to be limiting. The process 600 provides an example of the identification of a light source as illustrated in 420.

In 610, the obtaining module 310 may receive an infrared image of an environment captured by an imaging apparatus in a first configuration. More descriptions of receiving the infrared image may be found elsewhere in the present disclosure, e.g., 410 in FIG. 4, and descriptions thereof. In some embodiments, the obtaining module 310 may send the infrared image of the environment to the identification module 320.

In 620, the identification module 320 may determine a grayscale level of each of a plurality of pixels in the infrared image. For example, if the infrared image is a 14-bits grayscale image, the grayscale value of each pixel may take a value from 0 to $2^{14}-1$. Unlike a black-and-white visible light image, the grayscale image may be composed exclusively of shades of gray from black at the weakest intensity to white at the strongest intensity. The grayscale value may be higher (e.g., whiter) if the temperature of the light source is higher, and the grayscale value may be lower (e.g., darker) if the temperature of the light source is lower. The infrared detector 116 may measure and detect the thermal radiation of the light source in the environment to obtain grayscale values corresponding to the pixels of the light source in the infrared image. For example, the infrared detector 116 may generate a color map based on the detected thermal radiations in the environment and generate a grayscale image based on the color map. As another example, the infrared detector 116 may generate the grayscale image directly.

In 630, the identification module 320 may determine, among the plurality of pixels and based on the grayscale levels of pixels, a set of targets. The grayscale value of each of the set of target pixels may satisfy a condition relating to the grayscale level (or referred to as a grayscale level condition for brevity). The set of target pixels may be the pixels representing a target light source. For example, if the target light source is the sun, the set of target pixels may correspond to the thermal radiation level and position of the sun in the grayscale image. The grayscale level condition may be a grayscale value threshold or a grayscale value range used to distinguish the target light source from other objects. Specifically, the grayscale value of the sun may be close to a saturated grayscale value of the grayscale image. For instance, the corresponding grayscale value of the sun may be approximately 16383 in the 14-bits grayscale image, which may be higher than the majority of objects. The grayscale level condition may be a grayscale value threshold slightly less than 16383, e.g., 15000, 16000, 15563. For example, if the grayscale level condition is 15563, pixels with grayscale values greater than 15563 may be assigned to the set of target pixels.

In 640, the identification module 320 may determine, based on a shape detection algorithm, whether the set of target pixels forms a target shape of the light source in the infrared image. The shape detection algorithm of the present disclosure may include but not limited to a centre-of-gravity technique, a least squares fitting algorithm, a Hough transform algorithm, or the like, or any combination thereof. If the user wants to detect whether the sun exists in the environment, the target shape of the light source may be a circle or a portion thereof (e.g., an arc of a circle in cases, e.g., the sun being obscured by other objects or the sun being at the edge of the infrared image). The set of target pixels that forms substantially the target shape may be regarded as corresponding to the sun. In response to the determination that the set of target pixels forms substantially a target shape of the light source in the infrared image, process 600 may proceed to 650; otherwise, process 600 may proceed back to 610. As used herein, forming substantially a target shape may indicate that the deviation of the shape the set of target pixels form from the target shape is acceptable. The deviation may be assessed based on a degree of similarity between the shape that the set of target pixels form and the target shape. In some embodiments, the degree of similarity may be determined using a similar shape searching algorithm (e.g., Perceptual hash algorithm (PHA)), a feature matching algorithm (e.g., Scale-invariant feature transform (SIFT), Speeded Up Robust Features (SURF)), or the like, or any combination thereof.

If the degree of similarity between the shape that the set of target pixels form and the target shape is greater than a threshold (e.g., 70%, 80%, 90%, 95%, 99%), the deviation of the shape the set of target pixels form from the target shape is acceptable and the set of target pixels are considered to form substantially a target shape.

In 650, the identification module 320 may identify that the light source exists in the environment. After 650, the image processing device 120 may execute operation 430 (shown in FIG. 4) to further evaluate the identification.

In some embodiments, one or more operations may be added to or omitted from process 600. For example, a pre-processing operation may be added before 640. Before detecting the target shape, the identification module 320 may perform imaging enhancement process to the set of target pixels, which may improve the efficiency and accuracy of the shape detection. In some embodiments, operations 630 and 640 may be performed in any order or simultaneously. As another example, the operation 640 may be omitted. In other words, after determining that the grayscale values of a set of target pixels satisfy a condition relating to the grayscale level or represent a target light source in 630, the identification module 320 may directly identify that the light source exists in the environment, regardless of the shape that the set of target pixels form.

Figure 7:
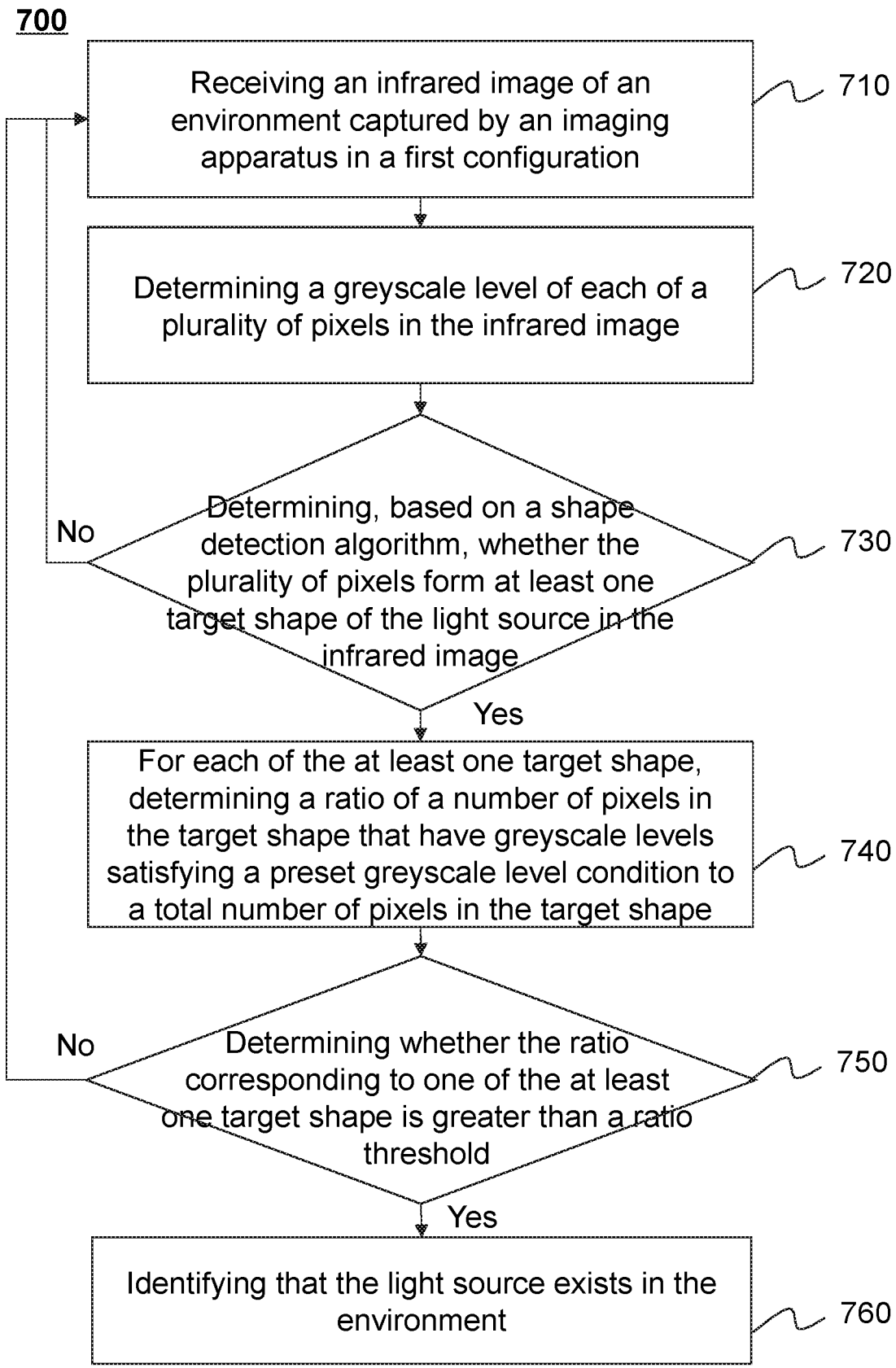
FIG. 7 is a flowchart illustrating an exemplary process for identifying a light source in an environment according to some embodiments of the present disclosure.

FIG. 7 is a flowchart illustrating an exemplary process for identifying a light source in an environment according to some embodiments of the present disclosure. In some embodiments, the process 700 may be implemented on the image processing system 100 as illustrated in FIG. 1. For example, the process 700 may be stored in a storage medium (e.g., the storage 140, or the storage device 250 of the computing device 200) in the form of instructions, and invoked and/or executed by the image processing device 120. The operations in the process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below are not intended to be limiting. The process 700 provides an example of the identification of a light source as illustrated in 420.

In 710, the obtaining module 310 may receive an infrared image of an environment captured by an imaging apparatus (e.g., imaging apparatus 110) in a first configuration. More descriptions of receiving the infrared image may be found elsewhere in the present disclosure, e.g., 410 in FIG. 4, 610 in FIG. 6, and descriptions thereof. In some embodiments, the obtaining module 310 may send the infrared image of the environment to the identification module 320.

In 720, the identification module 320 may determine a grayscale level of each of a plurality of pixels in the infrared image. Operation 720 may be similar to operation 620 and is not repeated herein.

In 730, the identification module 320 may determine, based on a shape detection algorithm, whether a set of adjacent pixels among the plurality of pixels form substantially a target shape of the light source in the infrared image. More descriptions of determining the grayscale level may be found elsewhere in the present disclosure (e.g., 640 in FIG. 6, and descriptions thereof). The identification module 320 may determine adjacent pixels with the same or similar grayscale value as an object. For example, if the target light source is the sun, the target shape of the light source may be a circle or a portion thereof. In some embodiments, the target shape may be a circle or an arc of a circle (e.g., in cases the sun being obscured by other objects or the sun being at the edge of the infrared image). The identification module 320 may identify substantially a circle or an arc of a circle formed by a set of adjacent pixels using the shape detection algorithm and deem the set of adjacent pixels corresponding to the sun. As another example, if the target light source is the steel making furnace, the target shape of the light source may be a rectangle (when the image is captured from a side of the steel making furnace) or a circle (when the image is captured from the top of the steel making furnace). In some embodiments, the target shape may be a rectangle, a straight line of a rectangle, a circle, an arc of a circle, a shape formed by at least one arc and at least one straight line (when the image is captured from an oblique direction). The identification module 320 may identify substantially the target shape formed by a set of adjacent pixels using the shape detection algorithm and deem the set of adjacent pixels corresponding to the steel making furnace. In response to the determination that the plurality of pixels form substantially a target shape of the light source of interest (or referred to as a target light source) in the environment captured in the infrared image, process 700 may proceed to 740; otherwise, process 700 may proceed back to 710.

In 740, for each of the at least one target shape, the identification module 320 may determine a ratio of a number (or count) of pixels in the set of pixels forming substantially target shape that have grayscale levels satisfying a preset grayscale level condition to a total number (or count) of pixels in the target shape. The identification module 320 may first determine whether pixels in the set satisfy a grayscale level condition. The grayscale level condition may be a grayscale value threshold or a grayscale value range used to distinguish the target light source from other objects. Merely by way of example, the target light source is the sun; the grayscale value of the sun may be close to a saturated grayscale value (e.g., a maximum value) of the grayscale image. The corresponding grayscale value of the sun may be approximately 16383 in the 14-bit grayscale image, which may be higher than the majority of objects. The preset grayscale level condition may be a grayscale value threshold slightly less than 16383, e.g., 15000, 16000, 15563 (0.9*16383). The grayscale value threshold may be at least 60%, or 70%, or 80%, or 90%, or higher than 90% of the grayscale value of the target light source captured in an image.

The identification module 320 may then determine the ratio of a number (or count) of pixels in the set of pixels forming substantially the target shape that have grayscale levels satisfying a preset grayscale level condition to a total number (or count) of pixels in the set. For example, the set of pixels forming substantially the target shape may include 10000 pixels. If 9900 pixels of the set satisfy the preset grayscale level condition, the ratio of a number (or count) of pixels in the set that have grayscale levels satisfying a preset grayscale level condition to a total number (or count) of pixels in the set is 99%. In some embodiments, the plurality of pixels may include more than one set of pixels, each set forming substantially a target shape of a light source in the infrared image in operation 730. The multiple target shapes may be the same, similar, or different. In this case, the identification module 320 may determine the ratio for each of the more than one set. For example, the identification module 320 may determine a first ratio for a first set of pixels forming substantially a first target shape to be 90% and a second ratio for a second set of pixels forming substantially a second target shape to be 80%. The first target shape and the second target shape may be the same or different.

In 750, the identification module 320 may determine whether the ratio corresponding to one of the at least one set of pixels forming substantially a target shape exceeds a ratio threshold. In response to the determination that the ratio corresponding to one of the at least one set of pixels exceeds a ratio threshold, process 700 may proceed to 760; otherwise, process 700 may return to 710. In some embodiments, ratios corresponding to more than one of the at least one set may be determined to exceed the ratio threshold. In this case, all of the more than one set may be identified as corresponding to light sources in 760 or only one or fewer than all of the more than one set of pixels may be identified as corresponding to the light source in 760. However, it should be noted that identifying only one target shape as a light source is already sufficient for 420 in process 400 to proceed to operation 430. Merely by way of example, if multiple sets of pixels forming substantially a target shape are identified, the set providing the higher ratio of pixels satisfying a preset condition (e.g., a preset grayscale level condition) may be selected as the result of the operation 420.

In 760, the identification module 320 may identify that the light source exists in the environment. After 760, the image processing device 120 may execute operation 430 (shown in FIG. 4) to further evaluate the identification.

Figure 8A:
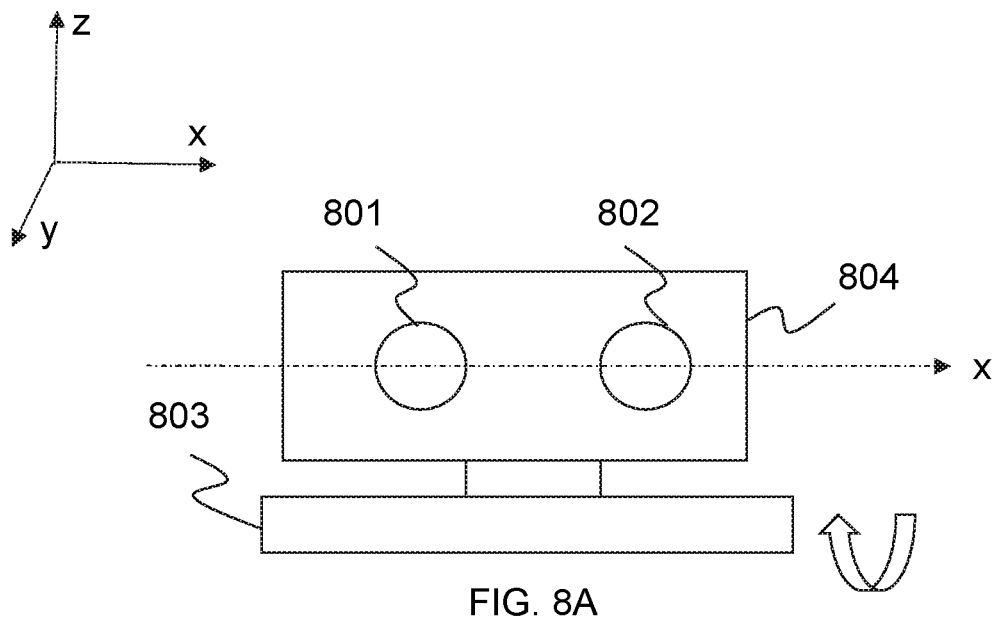
FIG. 8A and FIG. 8B are schematic diagrams illustrating examples of changing the configurations of the imaging apparatus according to some embodiments of the present disclosure.
Figure 8B:
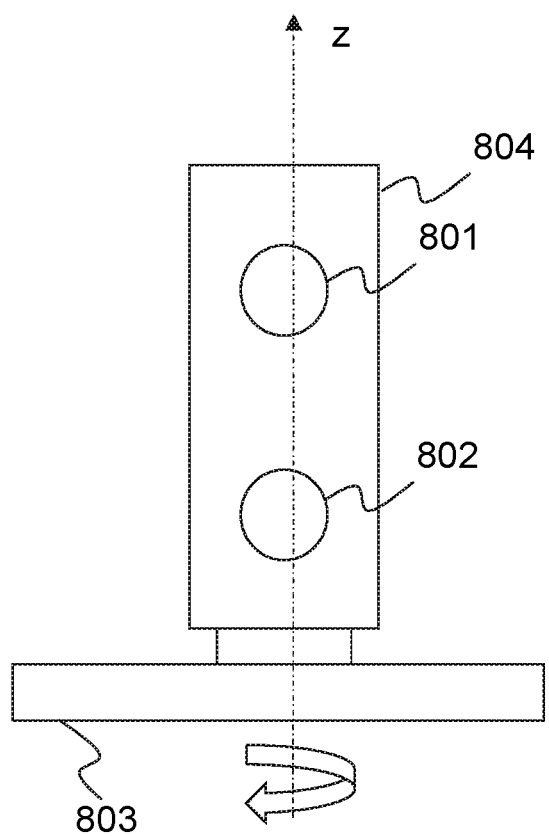

FIG. 8A and FIG. 8B are schematic diagrams illustrating examples of changing configurations of the imaging apparatus according to some embodiments of the present disclosure. FIG. 8A and FIG. 8B are examples of process 400 in FIG. 4 and/or operation 545 in FIG. 5. In some embodiments, the imaging device 804 may be an example of the imaging apparatus 110 (shown in FIG. 1 and FIG. 2) or a portion thereof. Cameras 801 and 802 may be cameras installed on the imaging device 804. In some embodiments, the camera 801 may be an infrared camera while the camera 802 may be a visible light camera 118, or vice versa. The imaging device 804 may be mounted on a pan-tilt head 803. The first configuration may include the pan-tilt head being in a first position as shown in FIG. 8A and FIG. 8B (e.g., a position such that the imaging apparatus orients the environment). The order for changing the imaging apparatus from the first configuration to the second configuration may include rotating the pan-tilt head 803 in a plane that is oblique or perpendicular to an axis connecting the camera 801 and camera 802 (e.g., x-axis in FIG. 8A, y-axis in FIG. 8B). In FIG. 8A, cameras 801 and 802 are arranged horizontally, the pan-tilt head 803 may rotate in a YZ plane that is perpendicular to the x-axis to the second configuration. In FIG. 8B, cameras 801 and 802 are arranged vertically, the pan-tilt head 803 may rotate in an XY plane that is perpendicular to the z-axis to the second configuration.

Figure 9:
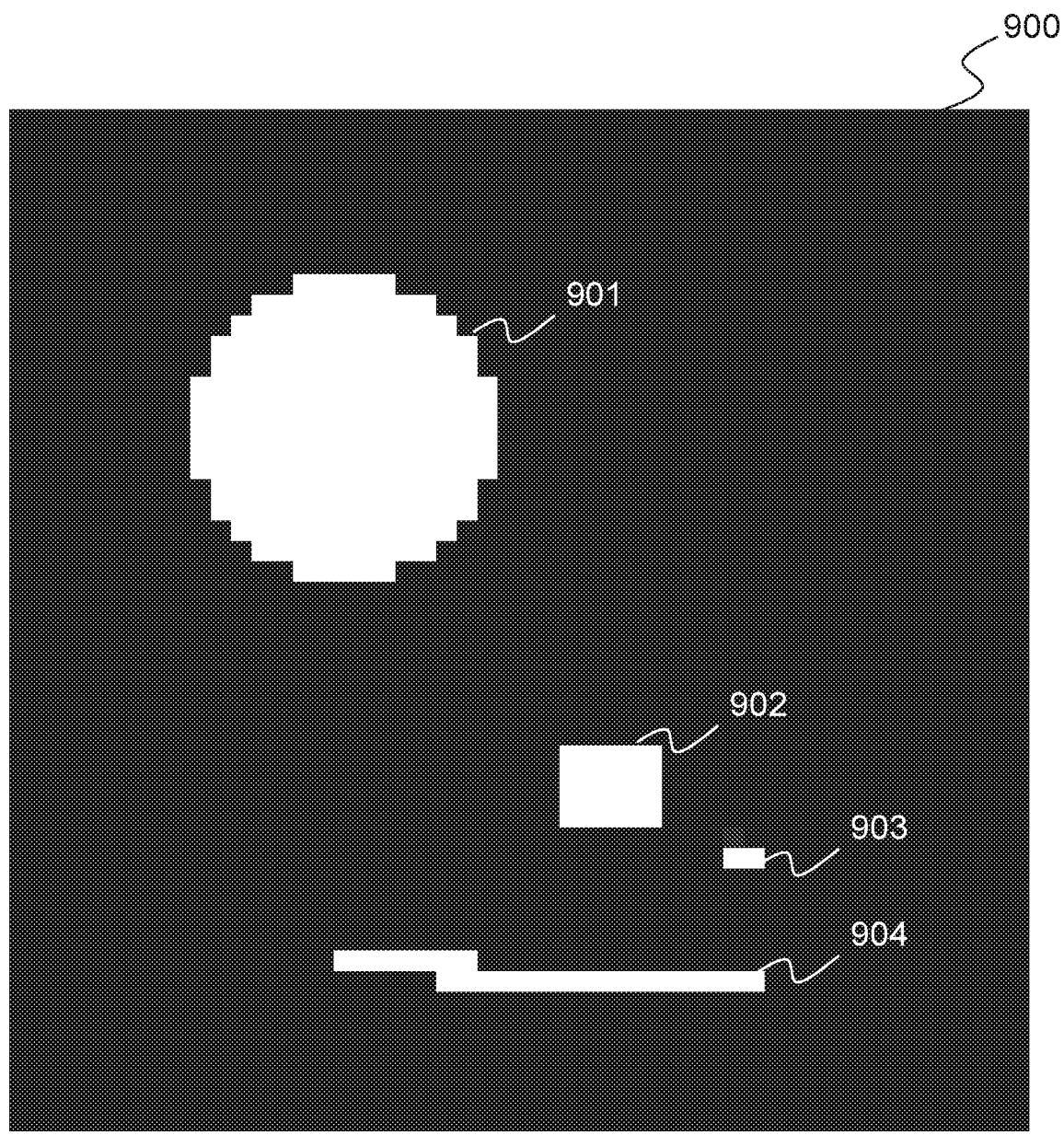
FIG. 9 is schematic diagrams illustrating an exemplary infrared image according to some embodiments of the present disclosure.

FIG. 9 is schematic diagrams illustrating an exemplary infrared image according to some embodiments of the present disclosure. As shown in FIG. 9, the infrared image 900 may include various light sources (or objects). Adjacent pixels with a same or similar grayscale value may be regarded as corresponding to a same light source. The infrared image 900 may include light sources 901 to 904. The identification module 320 may identify 901 as a round light source, such as the sun, a lamp, or the like. The identification module 320 may identify 902 as a rectangular light source, such as a storage box, a steel making furnace, or the like. Light source 903 may be identified as a low-intensity light source, such as a jet flame, a lighted match, or the like. The identification module 320 may identify 904 as a light source with a long shape, such as a wire, or the like.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. An apparatus, comprising:
   a processor; and
   a storage device storing instructions that, when executed by the processor, cause the apparatus to perform operations including:
   receiving an infrared image of an environment captured by an imaging apparatus in a first configuration;
   identifying, based on the infrared image, that a light source exists in the environment captured in the infrared image, wherein the light source is identified based on grayscale levels of pixels of an object in the infrared image and a shape of the object matching a preset shape; and
   generating an order for changing the imaging apparatus from the first configuration to a second configuration.

2. The apparatus of claim 1, wherein the identifying, based on the infrared image, that a light source exists in the environment captured in the infrared image comprises:
   determining a grayscale level of each of a plurality of pixels in the infrared image;
   determining, based on the grayscale levels of the plurality of pixels, a set of target pixels from the plurality of pixels, wherein the grayscale of each of the set of target pixels satisfies a grayscale level condition;
   determining, based on a shape detection algorithm, that the set of target pixels forms a target shape of the light source in the infrared image; and
   in response to the determination that the set of target pixels forms the target shape of the light source in the infrared image, identifying that the light source exists in the environment.

3. The apparatus of claim 1, wherein the identifying, based on the infrared image, that a light source exists in the environment captured in the infrared image comprises:
   determining a grayscale level of each of a plurality of pixels in the infrared image;
   determining, based on a shape detection algorithm, that the plurality of pixels form at least one target shape of the light source in the infrared image; and
   for each of the at least one target shape, determining a ratio of a count of pixels in the target shape that have grayscale levels satisfying a grayscale level condition to a total count of pixels in the target shape;

determining that the ratio corresponding to one of the at least one target shape exceeds a ratio threshold; and in response to the determination that the ratio corresponding to one of the at least one target shape exceeds the ratio threshold, identifying that the light source exists in the environment.

4. The apparatus of claim 1, wherein when executed by the processor, the instructions cause the apparatus to perform additional operations including:

before generating the order for changing the imaging apparatus from the first configuration to the second configuration, determining whether the identification of existence of the light source in the environment is a correct identification; and in response to the determination that the identification of existence of the light source in the environment is a correct identification, generating the order for changing the imaging apparatus from the first configuration to the second configuration.

5. The apparatus of claim 4, wherein the determining whether the identification of existence of the light source in the environment is a correct identification comprises:

receiving at least one reference infrared image captured by the imaging apparatus in the first configuration, wherein the at least one reference infrared image is captured later than a time when the infrared image is captured by a time interval;

identifying that the light source exists in the environment captured in the reference infrared image; and in response to the identification that the light source exists in the environment captured in the reference infrared image, confirming that the identification of existence of the light source in the environment captured in the infrared image is a correct identification.

6. The apparatus of claim 4, wherein the determining whether the identification of existence of the light source in the environment is a correct identification comprises:

determining at least one environment parameter associated with the light source at a time when the infrared image is captured;

determining that the at least one environment parameter satisfies at least one environment condition, and in response to the determination that the at least one environment parameter satisfies the at least one environment condition, determining that the identification of existence of the light source in the environment captured in the infrared image is a correct identification.

7. The apparatus of claim 1, wherein the infrared image is captured by a thermal imaging device in the imaging apparatus when a shutter of the thermal imaging device is open, and the order for changing the imaging apparatus from the first configuration to the second configuration includes changing status of the shutter of the thermal imaging device from open to closed.

8. The apparatus of claim 1, wherein the order for changing the imaging apparatus from the first configuration to the second configuration includes temporarily removing an optical filter of an imaging device in the imaging apparatus.

9. The apparatus of claim 1, wherein the imaging apparatus includes at least one imaging device installed on a pan-tilt head, and the order for changing the imaging apparatus from the first configuration to the second configuration includes rotating the pan-tilt head to change an orientation of the at least one imaging device in the imaging apparatus from a first orientation to a second orientation.

10. The apparatus of claim 9, wherein the at least one imaging device includes a visible light imaging device and a thermal imaging device, and when the visible light imaging device and the thermal imaging device are configured along an axis, the order for changing the imaging apparatus from the first configuration to the second configuration includes rotating the pan-tilt head in a plane that is oblique or perpendicular to the axis.

11. A method implemented on a computing device having at least one processor and at least one storage medium, the method comprising:

receiving an infrared image of an environment captured by an imaging apparatus in a first configuration;

identifying, based on the infrared image, that a light source exists in the environment captured in the infrared image, wherein the light source is identified based on grayscale levels of pixels of an object in the infrared image and a shape of the object matching a preset shape; and generating an order for changing the imaging apparatus from the first configuration to a second configuration.

12. The method of claim 11, wherein the identifying, based on the infrared image, that a light source exists in the environment captured in the infrared image comprises:

determining a grayscale level of each of a plurality of pixels in the infrared image;

determining, based on the grayscale levels of the plurality of pixels, a set of target pixels from the plurality of pixels, wherein the grayscale of each of the set of target pixels satisfies a grayscale level condition;

determining, based on a shape detection algorithm, that the set of target pixels forms a target shape of the light source in the infrared image; and in response to the determination that the set of target pixels forms the target shape of the light source in the infrared image, identifying that the light source exists in the environment.

13. The method of claim 11, wherein the identifying, based on the infrared image, that a light source exists in the environment captured in the infrared image comprises:

determining a grayscale level of each of a plurality of pixels in the infrared image;

determining, based on a shape detection algorithm, that the plurality of pixels form at least one target shape of the light source in the infrared image; and for each of the at least one target shape, determining a ratio of a count of pixels in the target shape that have grayscale levels satisfying a grayscale level condition to a total count of pixels in the target shape;

determining that the ratio corresponding to one of the at least one target shape exceeds a ratio threshold; and in response to the determination that the ratio corresponding to one of the at least one target shape exceeds the ratio threshold, identifying that the light source exists in the environment.

14. The method of claim 11, further comprising:

before generating the order for changing the imaging apparatus from the first configuration to the second configuration, determining whether the identification of existence of the light source in the environment is a correct identification; and in response to the determination that the identification of existence of the light source in the environment is a correct identification, generating the order for changing the imaging apparatus from the first configuration to the second configuration.

15. The method of claim 14, wherein the determining whether the identification of existence of the light source in the environment is a correct identification comprises:
receiving at least one reference infrared image captured by the imaging apparatus in the first configuration, wherein the at least one reference infrared image is captured later than a time when the infrared image is captured by a time interval;
identifying that the light source exists in the environment captured in the reference infrared image; and
in response to the identification that the light source exists in the environment captured in the reference infrared image, confirming that the identification of existence of the light source in the environment captured in the infrared image is a correct identification.

16. The method of claim 14, wherein the determining whether the identification of existence of the light source in the environment is a correct identification comprises:
determining at least one environment parameter associated with the light source at a time when the infrared image is captured;
determining that the at least one environment parameter satisfies at least one environment condition, and
in response to the determination that the at least one environment parameter satisfies the at least one environment condition, determining that the identification of existence of the light source in the environment captured in the infrared image is a correct identification.

17. The method of claim 11, wherein the infrared image is captured by a thermal imaging device in the imaging apparatus when a shutter of the thermal imaging device is open, and the order for changing the imaging apparatus from the first configuration to the second configuration includes changing status of the shutter of the thermal imaging device from open to closed.

18. The method of claim 11, wherein the imaging apparatus includes at least one imaging device installed on a pan-tilt head, and
the order for changing the imaging apparatus from the first configuration to the second configuration includes rotating the pan-tilt head to change an orientation of the at least one imaging device in the imaging apparatus from a first orientation to a second orientation.

19. The method of claim 18, wherein the at least one imaging device includes a visible light imaging device and a thermal imaging device, and
when the visible light imaging device and the thermal imaging device are configured along an axis, the order for changing the imaging apparatus from the first configuration to the second configuration includes rotating the pan-tilt head in a plane that is oblique or perpendicular to the axis.

20. A non-transitory computer readable medium embodying a computer program product, the computer program product comprising instructions configured to cause a computing device to:
receive an infrared image of an environment captured by an imaging apparatus in a first configuration;
identify, based on the infrared image, that a light source exists in the environment captured in the infrared image, wherein the light source is identified based on grayscale levels of pixels of an object in the infrared image and a shape of the object matching a preset shape; and
generate an order for changing the imaging apparatus from the first configuration to a second configuration.

* * * * *